Feb. 17, 1970 SHIGEYA NAKAMURA ET AL 3,495,514
EXPOSURE METER FOR SINGLE LENS REFLEX CAMERA OF
INTERCHANGEABLE OBJECTIVE TYPE
Filed Dec. 13, 1965 4 Sheets-Sheet 1

INVENTORS
S. NAKAMURA AND K. FURUTA
BY
ATTORNEY.

United States Patent Office 3,495,514
Patented Feb. 17, 1970

3,495,514
EXPOSURE METER FOR SINGLE LENS REFLEX CAMERA OF INTERCHANGEABLE OBJECTIVE TYPE
Shigeya Nakamura, Yokohama-shi, and Koichi Furuta, Tokyo, Japan, assignors to Nippon Kogaku K.K., Chuo-ku, Tokyo, Japan, a corporation of Japan
Filed Dec. 13, 1965, Ser. No. 513,279
Claims priority, application Japan, Dec. 25, 1964, 39/100,556; Dec. 29, 1964, 40/102,024
Int. Cl. G01j 1/00, 1/52; G03b 9/02
U.S. Cl. 95—10                    6 Claims

ABSTRACT OF THE DISCLOSURE

Exposure meter for a single lens reflex camera having interchangeable lenses and wherein photometering is done through the lens, means being provided for realigning the relationship between an exposure calculating device and the stop value of the lens selected for use according to the maximum aperture ratio of the selected lens, wherein an interlocking member corrects for the differences in the maximum aperture ratios of the lenses and provides an adjustment in an electrical exposure calculating circuit.

---

Figure 1:
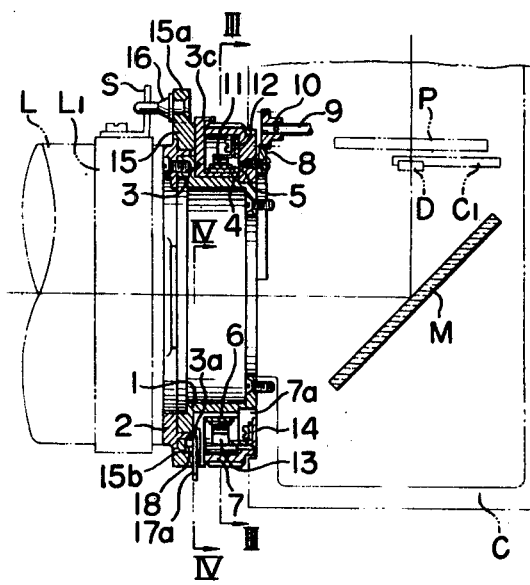

The present invention relates to an exposure meter of the type wherein the exposure time for an object to be photographed is determined by measuring the value of the light passing through the objective lens, and more particularly to a single lens reflex camera having a plurality of interchangeable lenses.

Generally speaking, in photographic cameras having interchangeable objectives, the exposure calculating mechanism provided in the camera body is interlocked with the stop operation of the objective. However, there are various restrictions in the interlocking action. For example, the angular displacement required for adjusting a specified aperture ratio to another specified aperture ratio must be equal in all of the interchangeable objectives, and in the relationship between each objective and the exposure calculating mechanism. The stop values indicated by the exposure calculating mechanism, when the objectives are mounted on the camera, must exactly accord with those to be shown by those objectives. Furthermore, when each objective is mounted on the camera, the interconnecting element of the exposure calculating mechanism must interlock perfectly with the stop signal member of the objective, and the exposure value indicated by the exposure calculating mechanism must be relevant with the exposure ratio of the objective used. It follows therefore as a general rule that the position of the interlocking member is common and definite to each objective.

In through the lens photometering, the problem of the recently introduced automatic preset stop mechanism must be overcome in using interchangeable lenses with an exposure meter. In such mechanisms the lens is opened to its maximum aperture ratio when light values are measured. The amount of light corresponding to the maximum aperture ratio of the selected objective becomes incident upon the impinging area of the exposure meter. If interchangeable objectives of various types be of the same maximum aperture ratio, there may be no difficulty. However, should there be a difference in the maximum aperture ratio, the use of a common exposure meter mechanism for determining illuminance of one and the same object will give different results according to the objective used.

For example, the value of light intensity as determined with the use of an objective having an aperture ratio of $f{:}2$ is different, upon conversion to an exposure value, from that as measured with an objective, for example, of $f{:}1.4$ or $f{:}2.8$, by one step of the exposure value, respectively. It is for this reason that, with a conventional exposure meter, only the focussing is done at the maximum aperture ratio, and thereafter the light measurement is made at the required aperture ratio.

The present invention overcomes such disadvantages by providing an exposure meter arrangement for a single lens reflex camera having interchangeable lenses and wherein photometric measurements are made through the lens, the arrangement providing an exposure calculating device coupled to the selected lenses and which is automatically adjusted to provide a correction in the electrical circuit of the exposure meter in accordance with the differences in the maximum aperture ratios of the lenses.

Figure 2:
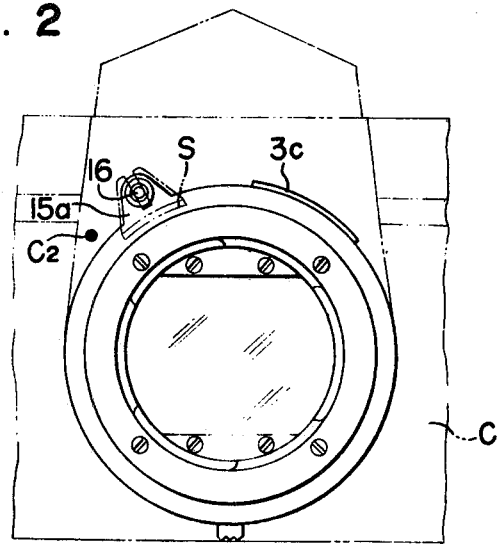
Figure 3:
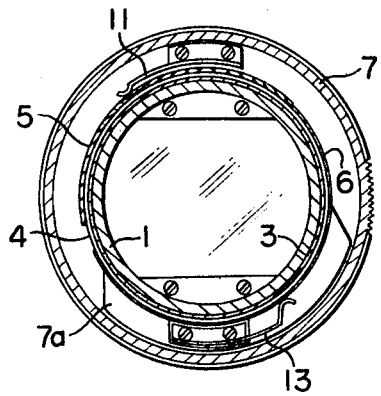
Figure 4:
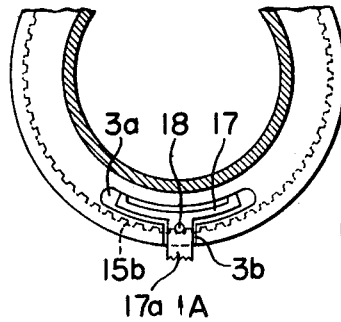
Figure 6:
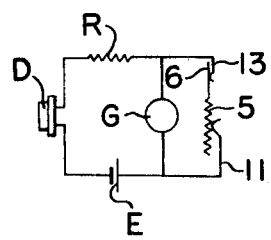
Figure 5:
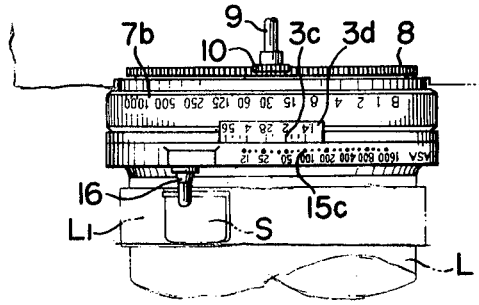
Figure 7:
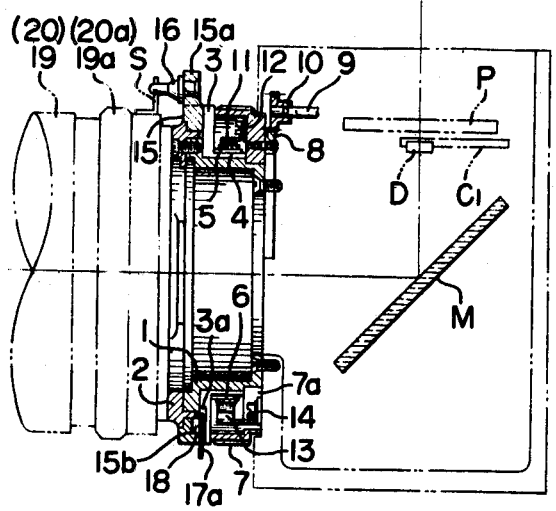
Figure 8:
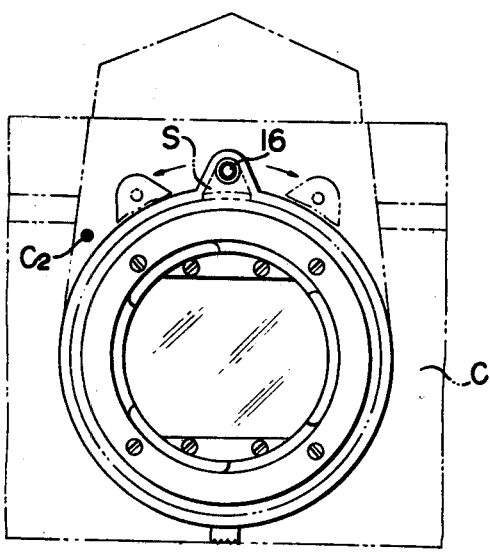
Figure 9:
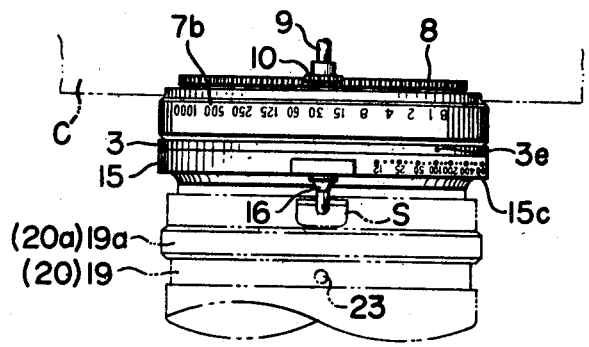
Figure 10:
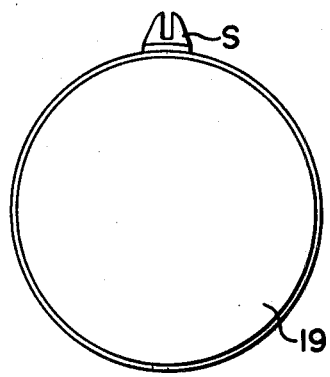
Figure 12:
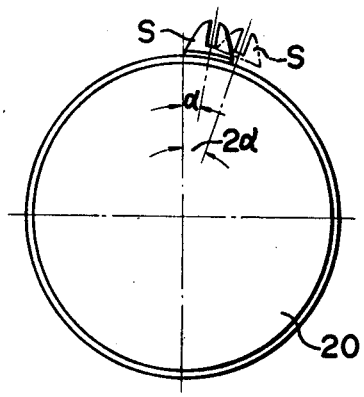
Figure 11:
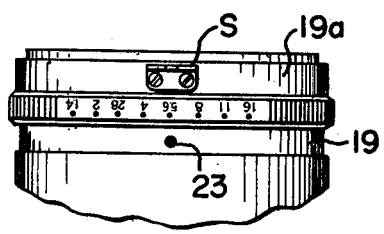
Figure 13:
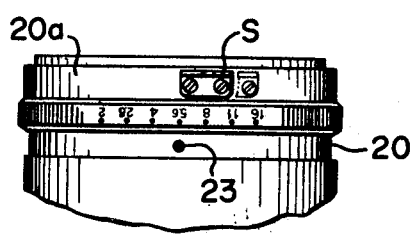

The objects and features of this invention will be more apparent from the following description taken in connection with the accompanying drawing showing illustrative embodiments of this invention in which:

FIG. 1 is a section of the principal parts of a first illustrative embodiment of this invention;
FIG. 2 is a side elevational view of FIG. 1;
FIGS. 3 and 4 are side views, respectively, taken along lines III—III, and IV—IV of FIG. 1;
FIG. 5 is a top view of FIG. 1;
FIG. 6 is an example of the exposure meter circuit usable for the embodiments of this invention; and
FIG. 7 through FIG. 11 show a second embodiment of this invention, where FIG. 7 is a section of the principal parts of the second embodiment, FIG. 8 is a side elevation thereof, FIG. 9 is a top view thereof. FIG. 10 is a front elevational view showing the location of the stop signal member on an objective of $f{:}1.4$ while FIG. 11 is a plan view thereof, FIG. 12 is a front view showing the location of the stop signal member on an objective of $f{:}2$, while FIG. 13 is a top view thereof.

Now referring to FIGS. 1 through 6, we explain the first embodiment of this invention in detail. The embodiment is described in connection with a focal plane shutter camera. In the drawing, C is the camera body, $C_1$ is a holder arm which carries a light impinging area D of the exposure meter provided in the viewfinder light path. Shutter index $C_2$ is provided on the front surface of the camera body C. Light impinging area D is a photoconductive body such as, for example, a CdS cell, M is a movable reflecting mirror, P is focusing plate.

A cylinder 1 is fixed to the camera body, 2 is a bayonet plate fixed on the front end of the cylinder 1, 3 is a ring for calculating exposure and the correcting aperture ratio and is rotatably mounted on the cylinder 1, the ring 3 having at its lower portion an arcuate slot 3a and a radially notched guide groove 3b (FIG. 4). On the upper peripheral portion 3c of the ring 3 are engraved aperture ratio indices 3d. The spaces between each of the indices 3d are determined to correspond to those of the film speed indices 15c and the stop index $L_1$. Thin strip insulation 4 is cemented on the cylindrical surface of the ring 3. A strip resistor 5 and a conductor 6 are disposed on the top surface of the insulation 4, both elements 5 and 6 being electrically connected as shown in FIG. 6.

Shutter speed ring 7 is rotatably mounted on cylinder 1 formed with an arcuate opening 7a as shown in FIG. 3 and, on the outer surface, is provided with shutter speed indices 7b. Element 8 is an arcuate gear fixed on the inner surface of shutter speed ring 7, and 9 is an interconnecting shaft associated with a conventional focal plane shutter mechanism (not shown for avoiding complexity of the drawing). Shaft 9 is associated with the arcuate gear 8 through a shutter gear 10 fixedly mounted on shaft 9. When the shutter ring 7 is rotated by a predetermined amount, this movement is transmitted to the not shown focal plane shutter mechanism to obtain the required shutter speed.

An electrical terminal 11 of elastic material is fixed to ring 7 through insulation 12 and a stationary terminal 13 is fixed to the body C through insulation 14. Stop interconnecting ring 15 is rotatably mounted on the bayonet plate 2, the outer periphery thereof being formed with projection 15a. A portion of the inner periphery thereof is formed with a plurality of semicircular stop holes 15b. Film speed indices 15c are provided on the top surface of the ring 15 and face the aperture ratio indices 3d. Interconnecting element 16 is fixed to projection 15a in interconnecting relation with stop signal member S provided on the objective. Substantially Y-shaped coupling plate 17 of elastic material, as shown in FIG. 4, has its upper forked portion within slot 3a which press fits the side wall of slot 3a its lower projection 17a precisely fitting within guide groove 3b (in FIG. 4 there is shown a clearance between the groove and the lower projection for illustrative convenience sake). Coupling pin 18 is fixed on the plate 17 to engage with semicircular stop holes 15b in a releasable manner which will hereinafter be apparent. It is added that coupling plate 17 is somewhat flexibly mounted with the aid of ring 3 and pin 18. Objective L is an interchangeable lens provided with a known automatic preset stop mechanism, and stop index ring $L_1$ of the objective has, at the required position thereon, a fork-shaped stop signal member S. With this arrangement, when the objective L is mounted on the body C, the member S engages the interconnecting element 16.

FIG. 6 shows an exposure meter circuit used for this embodiment where E is a battery electrically connected to a galvanometer G and a resistor R. The calculating mechanism comprising a resistor 5 and a movable terminal 11 of this exposure circuit, is designed on the basis of that the light intensity of the maximum aperture ratio of $f:1.4$ being incident upon light impinging area D. However, this is merely as an example, it is apparent that the calculating mechanism can be designed on the basis of incident light rays of the maximum aperture ratio of other objectives, for example, $f:2$ or $f:2.8$.

With the above described arrangement, when an objective of $f:1.4$ is mounted on the camera, index "1.4" of the indices 3d is set to accord with a selected film speed index, for example, of ASA100 of the indices 15c, and thereafter the shutter speed ring 7 and the stop index ring $L_1$ are rotated to move relatively movable terminal 11 and resistor 5 to actuate the galvanometer G, and the appropriate exposure value of the object to be photographed is accurately calculated. That is, when the shutter speed ring 7 is rotated, the movable terminal 11 is shifted, and when the ring $L_1$ is rotated, stop interconnecting ring 15 is rotated through the stop signal member S and the interconnecting element 16 to rotate the ring 3 with the aid of holes 15b and a coupling plate 17. Accordingly, the resistor 5 is rotated to shift its position relative to movable terminal 11.

When an objective of $f:2$ is mounted on the camera, index "2" of the indices 3d is set to the film speed index of ASA100 by turning the correcting ring 3 after the release of the engagement of pin 18 and hole 15b by depressing projection 17a of coupling plate 17. Then, the position of resistor 5 relative to movable terminal 11 shifts just one step of the exposure value. The value observed by galvanometer G shows the same value as if the objective $f:1.4$ were used and the aperture size were minimized to that of $f:2$. And accordingly, even when the incident light rays upon the area D decrease to one half the standard light rays, i.e. light rays obtainable by $f:1.4$, the calculating mechanism operates the same as in case of the objective of $f:1.4$. This is also true for other objectives such as $f:2.8$–$f:5.6$. When film speed has a value other than ASA100, the exposure measurement is made by setting a predetermined aperture ratio coincide with the new film speed value. It is to be added that since the variation of the resistance of the resistor 5 is determined by the exposure meter, it is applicable to the intermediate value of for example $f:1.8$, $f:2.5$, or $f:3.5$.

Now referring to FIG. 7 through FIG. 11, we explain the second embodiment of the invention. FIGS. 3, 4 and 6 are common to this embodiment.

In the second embodiment, the position of the stop signal member S of an interchangeable objective is shifted from the normal mounting position by an amount equal to the deviation of the maximum aperture ratio from the standard one. Thus, when the objective is mounted on the camera, the interconnecting element of the camera is shifted by said deviated amount to increase or decrease the resistance of the exposure calculating mechanism, to compensate for the variation of the resistance of the light impinging area produced by the variation of the intensity of the incident light rays.

In FIGS. 7 through 11, the elements designated by the same reference numerals represent equivalent portions shown in FIGS. 3, 4 and 6, and the elements shown in FIGS. 3, 4 and 6 are applicable to the second embodiment. However, in the second embodiment, the exposure calculating ring 3 is provided on its periphery with a film speed index point 3e instead of aperture ratio indices 3d of the first embodiment, the index 3e being juxtaposed the film speed indices 15c.

The calculating mechanism of the exposure meter circuit which comprises the resistor 5 and the movable terminal 11 is designed, the same as that for the first embodiment, on the basis that the light intensity of the maximum aperture ratio of $f:1.4$ is incident upon light impinging area D. However, it is apparent that the calculating mechanism can be designed on the basis of incident light rays of the maximum aperture ratio of other objective, for example, $f:2$ or $f:2.8$.

FIGS. 10 and 11 show interchangeable objectives, respectively, of the second embodiment; 19 in FIG. 10 is an objective having a maximum aperture ratio of $f:1.4$ with an automatic preset stop mechanism, stop signal member S being fixed at the location of $f:5.6$ on stop index ring 19a, while 20 in FIG. 11 is an objective having a maximum aperture ratio of $f:2$ with an automatic preset stop mechanism, stop signal member S being fixed at the location of $f:8$ on stop index ring 20a. Each interchangeable objective 19 or 20 bears stop index point 23, which always locates the top position when the objective is mounted on the camera.

Such being the structure, when interchangeable objective 19 with the maximum aperture ratio of $f:14$ is mounted to the camera, and since the exposure meter mechanism is determined on the basis of the incident light amount of $f:1.4$, the stop value of the objective ($f:5.6$ in the figure) may be immediately associated with the stop value of the exposure meter mechanism in the camera body (no necessity to correct the difference in aperture ratio). Therefore, the setting of the speed film by turning the exposure adjusting ring 3 by depressing projection 17a of coupling strip 17, and the subsequent turning of the shutter speed ring 7 and the stop index ring 19a causes the movable terminal 11 and strip resistor 5 to move relatively and effectively operate galvanometer G to determine a suitable exposure value for the object.

But, with an objective of a different maximum aperture ratio, for example $f:2$ designated at 20, since the position of signal member S deviates, compared to that of objective 19 of $f:1.4$, by one step $\alpha$ toward smaller aperture ratios, when the objective 20 is mounted and the stop value of the objective (in the figure $f:5.6$) shows the same as for the objective $f:1.4$ lens 19, the location of stop signal member S at the mounting position shifts by one step α toward smaller aperture ratios comparing to the location of the stop signal member S of the objective $f:1.4$. It follows therefore that interlocking element 16 of the camera rotates in interlocking action with the member S to increase the resistance value of the resistor 5 compared to the resistance value for the objective $f:1.4$ and compensate for the difference due to the variation in aperture ratios. Accordingly, despite the decrement of light intensity due to the difference in the maximum aperture ratio, the indication of galvanometer G does not differ from that obtainable by the use of the objective $f:1.4$, and subsequent exposure measuring operation can take place the same as in case of objective $f:1.4$. That is, a proper exposure value for the object to be photographed is always measured to be one and the same value when using either objective $f:1.4$ lens 19 or objective $f:2$ lens 20. It is apparent that above described principle can be applicable to other objectives, for example, of $f:2.8$. In case of objective $f:2.8$, incident light rays will be decreased by two steps of the exposure value, but this is compensated by shifting the location of stop signal member S by two steps ($2\alpha$) as shown in FIG. 11 by dotted line. When an objective to be used is faster than the standard objective, incident light rays will be increased over that of the standard objective, and for compensating this difference the location of the stop signal member for this faster objective should be shifted toward larger stop aperture ratio. When an objective having intermediate aperture ratio, for example, $f:1.8$, $f:2.5$ or $f:3.5$ and so on, the location of the stop signal member should be changed in accordance with the variation of the incident light rays.

As described above, in accordance with the second embodiment, automatic compensation for the variation of the incident light rays is readily made upon mounting the objective, since the stop signal member provided takes into account the compensation required and which is directly provided on the stop index ring.

What is claimed is:

1. An exposure meter for a single lens reflex camera of the interchangeable objective type, the combination comprising
   a cylinder fixed to the camera body, a stop signal member fixed on the stop presetting member of the lens and being rotatable therewith,
   a stop interconnecting ring,
   a correction ring,
   a shutter speed ring coupled to the shutter of the camera, the three rings being rotatably mounted on the cylinder, a coupling plate for coupling the correcting ring with the interconnecting ring,
   a coupling member on the interconnecting ring for coupling the stop signal member of the lens with the interconnecting ring, and
   an exposure meter circuit including a voltage source, a galvanometer, a photocell having a light receiving area on which the light rays passing through the maximum aperture of the lens are incident, and a variable resistor having a resistance element and a movable contact, the movable contact and resistance element being relatively movable by the stop interconnecting ring to realign the resistance value of the resistor when different lenses are attached to the camera, the rotation of the shutter speed ring varying the resistance value of the resistor.

2. An exposure meter according to claim 1, wherein the resistance element is mounted on the correcting ring and the movable contact is mounted on the shutter speed ring.

3. An exposure meter according to claim 2, wherein film speed indicia is provided on the interconnecting ring, maximum aperture ratio indicia on the correcting ring for alignment with the film speed indicia to provide a standard setting for the resistor, a pin on said coupling plate, and a series of openings in said interconnecting ring for receiving the pin selectively in accordance with the maximum aperture ratio of the lens connected to the camera to change the resistance value of the resistor from its standard setting.

4. An exposure meter according to claim 3, wherein the maximum aperture ratio indicia on the correcting ring is a reference mark.

5. An exposure meter according to claim 1, wherein film speed indicia is provided on the interconnecting ring, stop indicia on the correcting ring for alignment with the film speed indicia to provide a standard setting for the resistor, a pin on said coupling plate, and a series of openings in said interconnecting ring for receiving the pin selectively in accordance with the maximum aperture ratio of the lens connected to the camera to change the resistance value of the resistor from its standard setting.

6. An exposure meter according to claim 5, wherein the resistance element is mounted on the correcting ring and the movable contact is mounted on the shutter speed ring.

References Cited

UNITED STATES PATENTS

| | | | |
|---|---|---|---|
| 2,285,761 | 6/1942 | Tonnies | 95—10 |
| 2,351,978 | 6/1944 | Kuppenbender | 95—10 |
| 2,354,544 | 7/1944 | Rath | 95—10 |
| 2,379,102 | 6/1945 | Rath | 95—10 |
| 2,387,466 | 10/1945 | Rath | 95—10 |
| 2,573,729 | 11/1951 | Rath | 95—10 |
| 2,186,616 | 1/1946 | Mihalyi | 95—10 |
| 3,099,194 | 7/1963 | Weiss et al. | 95—10 |
| 3,194,135 | 7/1965 | Harter et al. | 95—10 |
| 3,078,772 | 2/1963 | Goshima. | |
| 3,163,097 | 12/1964 | Zenyoji et al | 95—42 XR |
| 3,262,380 | 7/1966 | Winkler. | |

NORTON ANSHER, Primary Examiner

J. F. PETERS, Jr., Assistant Examiner

U.S. Cl. X.R.

95—42, 64